United States Patent [19]
Okuda et al.

[11] 4,165,344
[45] Aug. 21, 1979

[54] CYCLOPENTADIENE RESIN AND ISOCYANATE CURED EPOXY RESIN COMPOSITIONS

[75] Inventors: Takao Okuda, Yokohama; Akira Wada, Kamakura, both of Japan

[73] Assignee: Nippon Zeon Co. Ltd., Tokyo, Japan

[21] Appl. No.: 795,370

[22] Filed: May 9, 1977

[30] Foreign Application Priority Data

May 17, 1976 [JP] Japan .................................. 51-56375

[51] Int. Cl.$^2$ ............................................. C08L 63/00
[52] U.S. Cl. ............................... 525/111; 260/37 EP; 525/113; 525/118; 525/124; 525/130
[58] Field of Search .............. 260/837 R, 836, 47 EN, 260/2 N, 77.5 AP

[56] References Cited

U.S. PATENT DOCUMENTS

| | | | |
|---|---|---|---|
| 3,317,471 | 5/1967 | Johnson et al. | 260/47 |
| 4,012,458 | 3/1977 | Wada et al. | 260/837 R |

*Primary Examiner*—Theodore E. Pertilla
*Attorney, Agent, or Firm*—Sherman & Shalloway

[57] ABSTRACT

An epoxy resin composition comprising (a) a cyclopentadiene-type hydrocarbon resin having a hydroxyl value of 100 to 300 obtained by copolymerizing a cyclopentadiene-type monomer and a hydroxyl-containing monolefinic monomer at elevated temperatures, (b) a polyol selected from the group consisting of epoxy resins containing at least two hydroxyl groups in the molecule and epoxy resin derivatives containing at least two hydroxyl groups in the molecule and obtained by the reaction of epoxy resins with alkanolamines, and (c) an isocyanate-type curing agent. The compositions have improved low temperature curability, acid resistance and water resistance while retaining the various desirable properties of epoxy resins such as chemical resistance and oil resistance, and which when used as paints, exhibit improved adhesion to an adherend and improved re-coating adhesion to the film formed thereon.

14 Claims, No Drawings

CYCLOPENTADIENE RESIN AND ISOCYANATE CURED EPOXY RESIN COMPOSITIONS

This invention relates to novel isocyanate-cured epoxy resin compositions. More specifically, it relates to epoxy resin compositions which have improved low temperature curability, acid resistance and water resistance while retaining the various desirable properties of epoxy resins such as chemical resistance and oil resistance, and which when used as paints, exhibit improved adhesion to an adherend and improved re-coating adhesion to the film formed thereon.

Epoxy resins have found a wide range of applications as adhesives, cast molding materials and paints because of their superior adhesiveness, flexibility, chemical resistance, corrosion resistance and electrical properties. In particular, epoxy resin paints are a noteworthy use. Two-package epoxy resin paints containing a polyamine or polyamide resin as a curing agent have previously been in wide use, and recently, compositions having improved impact strength, alkali resistance and water resistance of coated films were developed by blending cyclopentadiene-type hydrocarbon resins with epoxy resins (for example, Japanese Laid-Open Patent Publication No. 552/76). In spite of these advantages, the compositions have poor drying characteristics (curability) at low temperatures in the wintertime or in cold climate, and when used as paints, exhibit unsatisfactory adhesion to an adherend and to the film formed thereon.

It is a primary object of this invention therefore to provide a novel epoxy resin composition having superior oil resistance, low temperature curability, chemical resistance, acid resistance and water resistance.

Another object of this invention is to provide an epoxy resin composition which is suitable as a paint and affords coated films of superior adhesion to an adherend and to the film formed thereon, and superior color.

Other objects of the invention will become apparent from the following description.

We have found that a resin composition which meets these objects is prepared by mixing a certain cyclopentadiene type hydrocarbon resin with a certain epoxy resin, and adding a polyisocyanate compound.

The present invention therefore provides a novel epoxy resin composition comprising (a) a cyclopentadiene-type hydrocarbon resin having a hydroxyl value of 100 to 300 obtained by copolymerizing a cyclopentadiene-type monomer and a hydroxyl-containing monolefinic monomer at elevated temperatures, (b) a polyol selected from the group consisting of epoxy resins containing at least two hydroxyl groups in the molecule and epoxy resin derivatives containing at least two hydroxyl groups in the molecule obtained by the reaction of epoxy resins with alkanolamines, and (c) an isocyanate-type curing agent.

The cyclopentadiene-type hydrocarbon resin used in the invention can be prepared by polymerizing a cyclopentadiene-type monomer and a hydroxyl-containing copolymerizable monolefinic monomer in a pressure vessel at 200° to 300° C., preferably 250° to 280° C., for 0.5 to 20 hours, preferably 1 to 10 hours, in the absence of a non-radical initiating catalyst such as a cationic catalyst with or without an inert hydrocarbon solvent such as benzene, toluene or xylene, and then removing the unreacted monomers and the solvent by conventional means for purifying polymers such as distillation.

When the polymerization temperature is less than 200° C., the product becomes waxy, and a resinous product cannot be obtained. When it exceeds 300° C., the product is considerably colored, and its softening point rises remarkably. Moreover, a solvent-insoluble gel is formed. Thus, polymerization temperatures outside the specified range are not preferred.

The cyclopentadiene-type monomer means a monomer having a cyclopentadiene skeleton, and includes cyclopentadiene, lower alkyl (e.g., methyl or ethyl)-substituted cyclopentadienes, and lower Diels-Alder adducts of these such as dimers, trimers or codimers of these. Since cyclopentadiene is present stably as dicyclopentadiene at room temperature, cyclopentadiene and dicyclopentadiene are usually dealt with quite similarly.

Examples of the hydroxyl-containing monolefinic monomer copolymerizable with the cyclopentadiene-type monomer are allyl alcohol, crotyl alcohol, cis-2-butene-1,4-diol, hydroxyethyl acrylate, and hydroxyethyl methacrylate. Allyl alcohol gives especially good results.

The ratio between the cyclopentadiene-type monomer and the hydroxyl-containing monolefinic monomer to be copolymerized is not particularly restricted so long as the resulting resin has a hydroxyl value of 100 to 300. In commercial operations, the proportion of the cyclopentadiene-type monomer is preferably at least 50% by weight based on the total weight of the monomers in order to achieve good yields and color of the resulting resins.

In the synthesis of the cyclopentadiene-type hydrocarbon resin, another copolymerizable monomer may be used in an amount of less than 20% by weight of the total weight of the monomers. Resins obtained by using a monomer containing a polar group other than hydroxy such as vinyl acetate or methyl methacrylate instead of the hydroxyl-containing monolefinic monomer have satisfactory compatibility with epoxy resins and satisfactory adhesion of coated films, but show no improvement in water resistance and have poor acid resistance. Furthermore, resins obtained by using monomers containing no polar group such as styrene, 1,3-butadiene or 1,3-pentadiene instead of the hydroxyl-containing monolefinic monomer are quite incompatible with epoxy resins, and cannot give satisfactory coated films.

The cyclopentadiene-type hydrocarbon resin (a) used in the present invention needs to have a hydroxyl value of 100 to 300, preferably 150 to 280. When its hydroxyl value is less than 100, the hydrocarbon resin (a) has poor compatibility with epoxy resins. If it exceeds 300, no improvement in the water resistance of the composition can be expected, and its oil resistance is also somewhat inferior.

Although the cyclopentadiene-type hydrocarbon resin is not particularly restricted in other properties, it preferably has a softening point of 50° to 170° C. When its softening point exceeds 170° C., it is difficult to dissolve in epoxy resins. When applied as a paint, it affords coated films having a roughened surface and somewhat poor mechanical strength. Preferably, the resin has a Gardner color number of less than 10. The resin may also be those obtained by hydrogenation in accordance with a customary manner.

The polyol (b) to be mixed with the cyclopentadiene-type hydrocarbon resin (a) is selected from the group consisting of (i) epoxy resins containing at least two hydroxyl groups in the molecule and (ii) epoxy resin derivatives containing at least two hydroxyl groups in the molecule and obtained by the reaction of epoxy resins with alkanolamines. Certain ether-type epoxy resins such as a diglycidyl ether-type epoxy resin prepared from bisphenol A and epichlorohydrin come within the epoxy resins containing at least two hydroxyl groups in the molecule (i). But many other epoxy resins, such as glycidyl ether-type epoxy resin prepared from polypropylene glycol and epichlorohydrin, a glycidyl ester-type epoxy resin prepared from phthalic acid and epichlorohydrin, and alicyclic epoxy resins obtained by epoxidizing alicyclic dienes such as cyclopentadiene or cyclohexadiene, do not contain any hydroxyl group in the molecule. Thus, in the present invention, epoxy resin derivatives containing at least two hydroxyl groups in the molecule, which are obtained by reacting such hydroxyl-free epoxy resins with alkanolamines such as diethanolamine or diisopropanolamine to ring-open the epoxy group, are used as the polyol (b).

The ratio of the cyclopentadiene-type hydrocarbon resin (a) and the polyol (b) is such that the amount of component (a) is 90 to 5% by weight, preferably 60 to 30% by weight, and the amount of component (b) is 10 to 95% by weight, preferably 40 to 70% by weight. If the amount of component (a) is too large, the inherent properties of the epoxy resin (b) are impaired. If it is too small, the effect of improving adhesion or water resistance of coated films is reduced.

The isocyanate-type curing agent (c) is used for the polyol (b). Examples of the isocyanate-type curing agent are aliphatic polyisocyanates such as ethylene diisocyanate, ethylidene diisocyanate, propylene diisocyanate, butylene diisocyanate or hexamethylene diisocyanate; alicyclic polyisocyanates such as cyclopentylene diisocyanate and cyclohexylene diisocyanate; aromatic polyisocyanates such as 2,4-tolylene diisocyanate, 2,6-tolylene diisocyanate, diphenylmethane-4,4'-diisocyanate, triphenylmethane-4,4',4''-triisocyanate, 2,2'-diphenylpropane-4,4'-diisocyanate, 3,3'-dimethyldiphenylmethane-4,4'-diisocyanate, m- or p-phenylene diisocyanate, and naphthylene diisocyanate; and isocyanate-generating compounds which are obtained by reacting these polyisocyanates with such compounds as sodium hydrogen sulfite, aromatic secondary amines, tertiary alcohols, amides, phenols, lactams, heterocyclic compounds and sulfite salts, and which generate isocyanates upon heating.

The suitable amount of the isocyanate-type curing agent (c) is such that there are 0.3 to 1.5 equivalents of isocyanate groups in the isocyanate-type curing agent per equivalent of the hydroxyl groups contained in the polyol (b). If the amount of the isocyanate-type curing agent is too small, sufficient curability cannot be obtained. On the other hand, when the amount of the curing agent is too large, bubbling tends to occur by the reaction of the curing agent with moisture in the air during curing. Conventional curing agents such as amines, organometallic compounds, alkali metal compounds and fatty acid salts may be used together with these isocyanate-type curing agents.

The epoxy resin compositions of this invention are useful, for example, as coating compositions such as varnishes or enamels, adhesives and cast molding materials. For these applications, the epoxy resin composition may, as needed, include epoxy-type reactive diluents such as alkyl glycidyl ethers; non-reactive diluents; inorganic fillers such as talc, gypsum, alumina and asbestos; pigments; defoamers such as silicone resins; modifiers, flexibilizers or extenders, for example various resins such as phenolic resins, urea resins, melamine resins, polyester resins, and liquid rubbers.

The following examples illustrate the present invention more specifically. Unless otherwise specified, all parts and percentages in these examples are by weight.

EXAMPLE 1

A monomeric mixture consisting of dicyclopentadiene and allyl alcohol in the proportions shown in Table 1 was polymerized at 260° C. for 3 hours in the presence of xylene as a solvent. In each run, the resulting hydrocarbon resin was mixed with a hydroxyl-containing epoxy resin derivative and other ingredients in accordance with the formulations shown below to form a paint.

The resulting paint was coated on the surface of a test panel which had been cleaned by the method of JIS-K 5400 twice at a 24-hour interval using a bar coater having piano wires with a diameter of 1 mm. A coated film having a thickness of 60±3μ was formed. The coated film was cured at 25° C. for 7 days, and evaluated for various properties (Runs Nos. 1, 2, 3, 5, 6 and 7). The results are shown in Table 1.

For comparison, the same procedure was repeated except using hydrocarbon resins prepared from cyclopentadiene and other monomers not specified in the present invention (Runs Nos. 8, 9 and 10). The results are shown in Table 1.

For further comparison, the same test was performed when a cyclopentadiene-type hydrocarbon resin was not incorporated (Run No. 4); and when in accordance with the conventional technique, a bisphenol A/diglycidyl ether type epoxy resin (Epikote 1001, a product of Shell Chemical Co.) was used, and cured with a polyamide-type curing agent (Versamide 125, a product of Daiichi General Co., Ltd.) at 25° C. (Run No. 11). The results are also shown in Table 1.

| Mixing formulation | |
|---|---|
| Cyclopentadiene-type hydrocarbon resin | 25 parts |
| Epoxy resin derivative (solids content 60%)*1 | 125 parts |
| Isocyanate-type curing agent (solids content 75%)*2 | 69 parts |
| Epoxy thinner*3 | 34 parts |
| Solids content | 60% |
| [-OH]/[-NCO] equivalent ratio | 1.0/0.8 |
| Weight ratio of the cyclopentadiene-type hydrocarbon resin/ the epoxy resin derivative (as solids) | 25/75 |

Note
*1 An epoxy resin derivative prepared by reacting Epikote 1001 with diisopropanolamine at 100° C. for 3 hours, and having a hydroxyl value of 120 [containing 3.8( hydroxyl groups per molecule (theoretical value)].
*2 Desmodur L, a product of Sumitomo Bayer Urethane Co., Ltd.
*3 Methyl isobutyl ketone/toluene (=1/1)

Table 1

| | Invention | | | Comparison | | | | | | | |
|---|---|---|---|---|---|---|---|---|---|---|---|
| Run No. | 1 | 2 | 3 | 4 | 5 | 6 | 7 | 8 | 9 | 10 | 11 |
| Proportions (% by weight) of the monomers constituting the | | | | | | | | | | | |

Table 1-continued

| Run No. | Invention | | | | Comparison | | | | | | |
|---|---|---|---|---|---|---|---|---|---|---|---|
| | 1 | 2 | 3 | 4 | 5 | 6 | 7 | 8 | 9 | 10 | 11 |
| cyclopentadiene-type resin | | | | | | | | | | | |
| Dicyclopentadiene | 80 | 70 | 50 | — | 100 | 90 | 30 | 70 | 70 | 70 | 70 |
| Allyl alcohol | 20 | 30 | 50 | — | — | 10 | 70 | — | — | — | 30 |
| 1,3-Pentadiene | — | — | — | — | — | — | — | 30 | — | — | — |
| Vinyl acetate | — | — | — | — | — | — | — | — | 30 | — | — |
| Styrene | — | — | — | — | — | — | — | — | — | 30 | — |
| Softening point (°C.) of the resin | 105 | 90 | 88 | — | 95 | 153 | 50 | 100 | 90 | 110 | 90 |
| Hydroxyl value | 170 | 243 | 277 | — | 0 | 72 | 336 | 0 | 0 | 0 | 243 |
| Color (Gardner) | 6 | 8 | 10 | — | 3 | 5 | 11 | 4 | 4 | 5 | 8 |
| Curing agent * | I | I | I | I | I | I | I | I | I | I | PA |
| Properties of the coated film | | | | | | | | | | | |
| Condition of the coated film | Good | Good | Good | Good | Poor | Poor | Good | Poor | Good | Poor | Good |
| Pencil hardness | 2H | 2H less than 2 | 2H less than 2 | 2H | Not measured | Not measured | 2B less than 2 | Not measured | 2H less than 2 | Not measured | 2H less than 2 |
| Bending test (mm) | 4 | | | 4 | | | | | | | |
| Du Pont impact value ([gr]×[cm]×½ inch ball) | 500× 40 | 500× 50 | 500× 50 | 500× 50 | be-cause the comp-atibility of the cyclo-pentadiene resin with the epoxy resin was poor | be-cause the comp-atibility of the cyclo-pentadiene resin with the epoxy resin was poor | 1000× 50 | be-cause the comp-atibility of the cyclo-pentadiene resin with the epoxy resin was poor | 500× 30 | be-cause the comp-atibility of the cyclo-pentadiene resin with the epoxy resin was poor. | 500× 50 |
| Erichsen test (mm) | more than 8 | more than 8 | more than 8 | more than 8 | | | more than 8 | | more than 8 | | more than 8 |
| Crosscut tape test | 100/100 | 100/100 | 100/100 | 50/100 | | | 100/100 | | 100/100 | | 70/100 |
| Acid resistance test (10% H₂SO₄ aq. 25° C. × 1 month) | ++ | ++ | + | ++ | | | ++ | | + | | — |
| Alkali resistance test (10% NaOH aq. 25° C. × 1 month) | ++ | ++ | ++ | ++ | | | ++ ++ | | ++ | | ++ ++ |
| Hot water resistance test (50° C. × 7 days) | ++ | ++ | ++ | + | | | + | | — | | ++ |
| Solvent resistance test (toluene, 25° C. × 1 month) | ++ | ++ | ++ | ++ | | | — | | +++ | | ++ |
| Drying characteristics (50° C. × 3 days) | cured and dried | cured and dried | cured and dried | cured and dried | | | cured and dried | | cured and dried | | half dried |

*I=isocyanate; PA=polyamide

In the tests for resistances to acid, alkali, hot water and solvent, the results were evaluated on a scale of three grades in which (++) means that no change occurred in the appearance of the coated films; (+) means that some cloudiness or small swellings appeared in the coated films; and (−) means that marked cloudiness appeared in the coated films, or the coated films were swollen or peeled. The same standards of evaluation are used throughout this application.

As shown in Table 1, coated films obtained by the compositions of Runs Nos. 1 to 3 which had been prepared from cyclopentadiene resins having a hydroxyl number of 100 to 300 had better adhesion (crosscut tape test) and hot water resistance than that obtained from the composition containing the epoxy resin derivative alone (Run No. 4), and showed equal or better mechanical properties and resistances to water and other chemicals to or than the latter. The compositions of the invention also exhibited good low temperature curability.

On the other hand, the compositions in Runs Nos. 5 and 6 which were prepared from cyclopentadiene-type resins having a hydroxyl value of less than 100 gave only those coated films which had uneven surfaces and inferior transparency and mechanical properties because these resins did not sufficiently uniformly mingle with the epoxy resin derivative. On the other hand, the composition obtained in Run No. 7 from the cyclopentadiene resin having a hydroxyl value of more than 300 had uniform miscibility, and gave coated films which had an even surface, was transparent, and had mechanical properties as good as those of a coated film obtained from an epoxy resin derivative alone. However, the coated film had inferior hardness, and hot water and oil resistances to the coated films in accordance with the present invention.

Cyclopentadiene resins obtained by copolymerizing cyclopentadiene with 1,3-pentadiene and styrene which are monomers containing no polar group were not miscible with the epoxy resin derivative (Runs Nos. 8 and 10), and did not afford satisfactory coated films as in the case of using cyclopentadiene resins having a hydroxyl value of less than 100 (Runs Nos. 5 and 6). A cyclopentadiene resin obtained by polymerizing cyclopentadiene with vinyl acetate which is a monomer having a polar group other than hydroxyl had good miscibility with the epoxy resin derivative. The coated film had good mechanical properties and resistance to alkali, but had somewhat inferior hot water and acid resistances to the composition of the present invention and the epoxy resin derivative alone.

The composition in Run No. 11 which used a polyamide resin as a curing agent in accordance with the conventional technique showed equivalent mechanical properties to the composition of the present invention, but was inferior in adhesion, acid resistance and drying characteristics at low temperature (5° C.).

EXAMPLE 2

Paints were prepared by mixing the cyclopentadiene-type resin (cyclopentadiene/allyl alcohol=70/30; softening point 90° C.; hydroxyl number 243), the epoxy resin derivative (hydroxyl number 120) and the isocyanate-type curing agent as used in Run No. 2 of Example 1 in the various proportions shown in Table 2. The properties of the paints were evaluated in the same way as in Example 1. The results are shown in Table 2.

Table 2

| Run No. | | Invention | | | Comparison |
| --- | --- | --- | --- | --- | --- |
| | | 1 | 2 | 3 | 4 |
| Cyclopentadiene-type resin (solids 100%) | | 10.0 | 50.0 | 75.0 | — |
| Epoxy resin derivative (solids 60%) | Parts | 150.0 | 83.4 | 41.7 | 167.0 |
| Isocyanate resin (solids 75%) | | 82.9 | 46.0 | 23.0 | 92.2 |
| Weight ratio of cyclopentadiene-type resin/epoxy resin derivative (solids) | | 10/90 | 50/50 | 75/25 | 0/100 |
| Equivalent ratio of [—OH] in the epoxy resin derivative/[—NCO] in the isocyanate resin | | 1.0/0.8 | 1.0/0.8 | 1.0/0.8 | 1.0/0.8 |
| Properties of the coated films* | | | | | |
| Condition of the coated film | | Good | Good | Good | Good |
| Pencil hardness | | 2H | 2H | H | 2H |
| Bending test | | 4 | less than 2 | 8 | 4 |
| Du Pont impact value | | 500×50 | 500×50 | 500×10 | 500×50 |
| Erichsen test | | more than 8 | more than 8 | 6 | more than 8 |
| Crosscut tape test | | 100/100 | 100/100 | 100/100 | 72/100 |
| Acid resistance test | | ++ | ++ | ++ | ++ |
| Alkali resistance test | | ++ | ++ | ++ | ++ |
| Hot water resistance test | | ++ | ++ | ++ | ++ |
| Solvent resistance test | | ++ | ++ | ++ | ++ |
| Drying characteristics | | cured and dried | cured and dried | cured and dried | cured and dried |

*The properties were measured by the same methods as indicated in Example 1.

The compositions of this invention had better adhesion (crosscut tape test) and hot water resistance then in the case of using the epoxy resin derivative alone (Run No. 4), and had equally good drying characteristics at low temperatures.

pentadiene resins, resin compositions were prepared in the same way as in Example 1. Coated films prepared from the resin compositions were tested in the same way as in Example 1. The results are shown in Table 3. All of these coated films had superior characteristics.

Table 3

| Run No. | Invention | | |
| --- | --- | --- | --- |
| | 1 | 2 | 3 |
| Comonomer | cis-2-butene-1,4-diol | hydroxy-ethyl meth-acrylate | crotyl alcohol |
| Softening point (°C.) | 106 | 150 | 83 |
| Hydroxyl value | 213 | 128 | 168 |
| Properties of the coated films* | | | |
| Condition of the coated film | Good | Good | Good |
| Pencil hardness | 2H | 2H | 2H |
| Bending test | less than 2 | 4 | 4 |
| Du Pont impact value | 500 × 50 | 500 × 50 | 500 × 40 |
| Erichsen test | more than 8 | more than 8 | more than 8 |
| Crosscut tape test | 100/100 | 100/100 | 100/100 |
| Acid resistance test | ++ | ++ | ++ |
| Alkali resistance test | ++ | ++ | ++ |
| Hot water resistance test | ++ | ++ | ++ |
| Solvent resistance test | ++ | ++ | ++ |
| Drying characteristics | cured and dried | cured and dried | cured and dried |

*The properties were measured by the same methods as indicated in Example 1.

EXAMPLE 3

In this Example, other hydroxyl-containing monomers were used instead of the allyl alcohol used in the preceding Examples.

A cyclopentadiene-type resin composed of 70% of cyclopentadiene and 30% of hydroxyethyl methacrylate, cis-2-butene-1,4-diol, or crotyl alcohol was prepared in the same way as in Example 1. Using the cyclo-

EXAMPLE 4

The same cyclopentadiene resin and isocyanate-type curing agent as used in Run No. 2 of Example 1 and each of the ether-type epoxy resins shown in Table 4 were mixed in the proportions shown in Table 4. The properties of the compositions were evaluated in the same way as in Example 1. The results are shown in Table 4.

Table 4

| Run No. | | Invention | | |
| --- | --- | --- | --- | --- |
| | | 1 | | 2 |
| Cyclopentadiene-type resin (solids 100%) | | 25 | 25 | 25 |
| Epoxy resin (solids 100%) | Parts | 75*1 | 75*2 | 75*3 |
| Curing agent (solids 75%) | | 30 | 30 | 30 |
| Equivalent ratio of [—OH] in the epoxy resin to [—NCO] in the curing agent | | 1.0/0.56 | 1.0/0.46 | — |
| Number of [—OH] per molecule of the epoxy resin | | 2 | 8 | 0 |
| Properties of the coated films*4 | | | | |
| Condition of the coated films | | Good | Good | |
| Pencil hardness | | H | 2H | Not evaluated |

Table 4-continued

| | Invention | | |
|---|---|---|---|
| Run No. | 1 | 2 | |
| Bending test | less than 2 | less than 2 | because the paint |
| Du Pont impact value | 1000 × 300 | 1000 × 400 | applied did not |
| Erichsen test | more than 8 | more than 8 | cure, and a |
| Crosscut tape test | 100/100 | 100/100 | coated film |
| Acid resistance test | ++ | ++ | was not |
| Alkali resistance test | ++ | ++ | obtained |
| Hot water resistance test | ++ | ++ | |
| Solvent resistance test | ++ | ++ | |
| Drying characteristics | cured and dried | cured and dried | |

*[1]Epikote 1001 (Shell Chemical Co.);
*[2]Epikote 1007 (Shell Chemical Co.);
*[3]Epikote 828 (Shell Chemical Co.);
*[4]The properties were measured by the same methods as indicated in Example 1.

The results shown in Table 4 show that when epoxy resins containing at least two hydroxyl groups per molecule are used, the resulting compositions afford coated films having superior physical properties and resistances to acid, alkali, hot water, and to solvent, but when an epoxy resin containing no hydroxyl group is used, a cured coating cannot be obtained.

What we claim is:

1. An epoxy resin composition comprising
   (a) a cyclopentadiene or cyclopentadiene skeleton-containing hydrocarbon resin having a hydroxyl value of 100 to 300 obtained by copolymerizing cyclopentadiene or a cyclopentadiene skeleton-containing monomer and a hydroxyl-containing monolefinic monomer at elevated temperatures,
   (b) a polyol selected from the group consisting of epoxy resins containing at least two hydroxyl groups in the molecule and epoxy resin derivatives containing at least two hydroxyl groups in the molecule and obtained by the reaction of epoxy resins with alkanolamines, and
   (c) an isocyanate group containing polyol curing agent wherein the amounts of the cyclopentadiene hydrocarbon resin (a) and the polyol (b) are 90 to 5% by weight, and 10 to 95% by weight, respectively based on the total weight of the components (a) and (b).

2. The composition of claim 1 wherein the isocyanate curing agent (c) is contained in an amount such that there are 0.3 to 1.5 equivalents of isocyanate groups per equivalent of the hydroxyl groups based on the polyol (b).

3. The composition of claim 1 wherein the cyclopentadiene hydrocarbon resin (a) has a softening point of 50° to 170° C., and a Gardner color number of not more than 10.

4. The composition of claim 3 wherein the cyclopentadiene monomer is cyclopentadiene, methyl cyclopentadiene, or a dimer, trimer or codimer of any of these.

5. The composition of claim 3 wherein the hydroxyl-containing monolefinic monomer is allyl alcohol, crotyl alcohol, cis-2-butene-1,4-diol, hydroxyethyl acrylate, or hydroxyethyl methacrylate.

6. The composition of claim 1 wherein the polyol (b) is an ether group containing epoxy resin.

7. The composition of claim 1 wherein the polyol (b) is synthesized by the reaction of an ether group containing glycidyl ester group containing or alicyclic epoxy resin with an alkanolamine.

8. The composition of claim 1 wherein the isocyanate groups containing curing agent (c) is an aliphatic, alicyclic or aromatic polyisocyanate.

9. The composition of claim 1 wherein the hydroxyl-containing monolefinic monomer is allyl alcohol.

10. The composition of claim 1 wherein the polyol (b) is the condensation product of bisphenol A and epichlorohydrin.

11. The composition of claim 5 wherein the polyol (b) is a glycidyl ether group-containing epoxy resin or an epoxy resin which is the reaction product of a glycidyl ether group-containing, glycidyl ester group-containing or alicyclic epoxy resin with an alkanolamine.

12. The composition of claim 11 wherein the isocyanate group-containing curing agent (c) is an aliphatic, alicyclic or aromatic polyisocyanate wherein the isocyanate curing agent is contained in an amount such that there are 0.3 to 1.5 equivalents of isocyanate groups per equivalent of the hydroxyl groups based on the polyol (b).

13. The composition of claim 12 wherein the hydroxyl-containing monolefinic monomer is allyl alcohol and the polyol (b) is a glycidyl ether group-containing epoxy resin.

14. The composition of claim 12 wherein the amount of the cyclopentadiene hydrocarbon resin (a) and the polyol (b) are 60 to 30% by weight, and 40 to 70% by weight, respectively, based on the total weight of components (a) and (b).

* * * * *